United States Patent [19]
Henfrey

[11] 3,830,462
[45] Aug. 20, 1974

[54] VALVES

[75] Inventor: Gerard Peter Henfrey, Woking, England

[73] Assignee: Spiran Sarco Limited, Cheltenham, England

[22] Filed: Dec. 28, 1973

[21] Appl. No.: 429,211

Related U.S. Application Data

[63] Continuation-in-part of Ser. No. 282,937, Aug. 23, 1972, abandoned.

[52] U.S. Cl. ......................................... 251/5, 251/7
[51] Int. Cl. .............................................. F16k 7/06
[58] Field of Search ........................... 251/5, 6, 7, 8

[56] References Cited
UNITED STATES PATENTS
2,987,292  6/1961  Teson et al. ............................. 251/6

3,685,538  8/1972  Sullivan ............................... 251/5 X

FOREIGN PATENTS OR APPLICATIONS
800,039  8/1958  Great Britain ......................... 251/8

Primary Examiner—Arnold Rosenthal
Attorney, Agent, or Firm—Larson, Taylor & Hinds

[57] ABSTRACT

A valve including a passage for fluid to pass through having a flexible walled portion, an obstructor within this portion, and means for bringing this portion into engagement with the obstructor to seal the portion to the obstructor and hence close the passage to fluid flow, this means including a coil of filamentary material around the flexible walled portion, and a member for acting on the coils to cause them to act on the flexible walled portion to effect said engagement.

5 Claims, 6 Drawing Figures

3,830,462

VALVES

This application is a continuation-in-part application of the parent application Ser. No. 282937 filed August 23rd, 1972, now abandoned.

BACKGROUND OF THE INVENTION

The invention relates to valves for controlling flow of fluid through pipelines.

Many types of valve are presently available and, in recent years, there have been several designs used to eliminate the gland otherwise present to isolate the external operating mechanism from the fluid being controlled by the valve. Also, there are many designs now available which ensure a leakproof cut-off between the ingoing and outgoing fluid when the valve is in the closed condition. Also, to allow valves to pass fluids corrosive to normal metals, liners of plastics materials have been provided to prevent the fluid contacting the main structure of the valve. Valves combining all the above features are available, but this, in general, has led to three main problems:

a. Very high operating forces required to power the valves to the closed or open condition.

b. Serious limitations to fluid pressures within the valves when in larger sizes.

c. Difficulty in providing one design of valve which may be assembled so as to adopt either the open or the closed condition in the event of removal of the actuating force.

Valves have been proposed that overcome some of these problems, in which the fluid flow passage through the valve is formed by a flexible tubular member and valve closure is effected by compressing this member radially inwards to seal on itself or on an obstructor disposed within the member. However, further problems arise with valves of this construction in that the radial pressure is applied to the tubular member by surfaces such as cams or balls disposed at angularly spaced-apart points around the circumference of the tubular member. Where the flexible member is compressed to seal on itself these surfaces have to be few in number so that they do not interfere with each other during the relatively large travel that is required of them to effect valve closure, and consequently the tubular member enters the spaces between the surfaces and is severely distorted in the valve closed condition. This is well illustrated in U.S. Pats. Nos. 2,987,292 and 3,685,538. Wear and tear on the tubular member is thus high. Where the valve member is compressed to seal on an obstructor within it, the travel of the surfaces can be less, so that more can be provided. However, the spacing of these surfaces still has to be sufficient for the cams or balls to be accommodated around the tubular member, and accordingly even where the maximum number of cams or balls possible is utilised, there must be left gaps between the points at which closing pressure is applied to the tubular member, and these gaps are of necessity of a size such that the tubular member can expand thereinto in the valve closed condition, so that leakage paths tend to occur. This can best be illustrated by reference to FIG. 1 of the accompanying drawings. In this Figure there is diagrammatically illustrated, in cross-section, part of a valve shown in closed condition. This valve has a flexible tube T forming the path for fluid flow through the valve, an obstructor O within the tube T, and a ring of ball bearings B around the tube T in the region of the obstructor O. To close the valve the ball bearings B are urged inwardly, for example by a tapering cam surface (not shown) moved axially of the tube T, to deform the tube T inwardly to seal on the obstructor O but, as shown in FIG. 1, at the gaps between adjacent ball bearings the tube T can balloon outwardly so that leakage paths tend to occur. This problem can be minimised by thickening the tube T at the zone where the balls act, or by providing an insert between the balls and the tube (for example a thick, resilient ring), but this leads to a further problem in that the operating forces required to deform the insert in addition to the tube are high, and as the balls bear on the operating cam surface at spaced, highly loaded, points hardened balls and cam have to be used to combat wear.

According to the present invention there is provided a valve including an annular passage for fluid to pass through defined by a flexible wall and an obstructor within the wall, and operating mechanism for bringing about engagement between the wall and the obstructor to seal the wall to the obstructor and hence close the passage to fluid flow; said operating mechanism comprising a frusto-conical cam surface surrounding the flexible wall and movable substantially axially of the intended direction of fluid flow through the passage, and a coil of filamentary material disposed intermediate the cam surface and the flexible wall with its direction of length extending around the flexible wall so that the coils extend across the gap between the cam surface and the flexible wall to be acted upon by the cam surface, upon axial movement thereof, to be moved substantially radially with respect to said intended direction of fluid flow to act on the wall to bring about said engagement, the coils being so closely spaced together as to present a substantially continuous surface to the flexible wall in the closed condition of the valve. In a specific embodiment in which a coiled spring is utilised and the nominal outside diameter of the flexible wall is of the order of 40 mm., the nominal diameter across the coils of the spring is of the order of 8 mm., the wire diameter of the spring is 0.05 ins., and the pitch of the coils of the spring in unstressed condition is 10 coils per inch, the spring thus having of the order of 60 coils which in the closed condition of the valve are nearly touching. It will be appreciated that such a large number of contact points between the cam surface and the flexible wall has the effect that the tendency of the flexible wall to balloon in the closed condition is minimised and any stiffening of the wall, or any insert member provided between the wall and the spring, needs to be of minimal thickness only so that the forces necessary to effect valve closure are greatly reduced and accordingly the cam surface can be of un-hardened steel.

For a better understanding of the invention and to show how the same may be carried into effect, reference will now be made, by way of example, to FIGS. 2A, 2B and 3 to 5 of the accompanying drawings, in which:-

DESCRIPTION OF THE PREFERRED EMBODIMENTS

Figure 1:
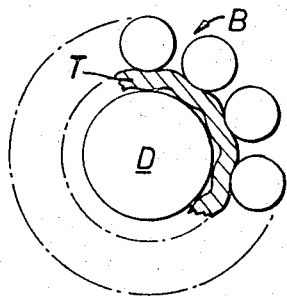
FIG. 1 is the cross-sectional view, already described, of part of a previously proposed form of valve.
Figure 2A:
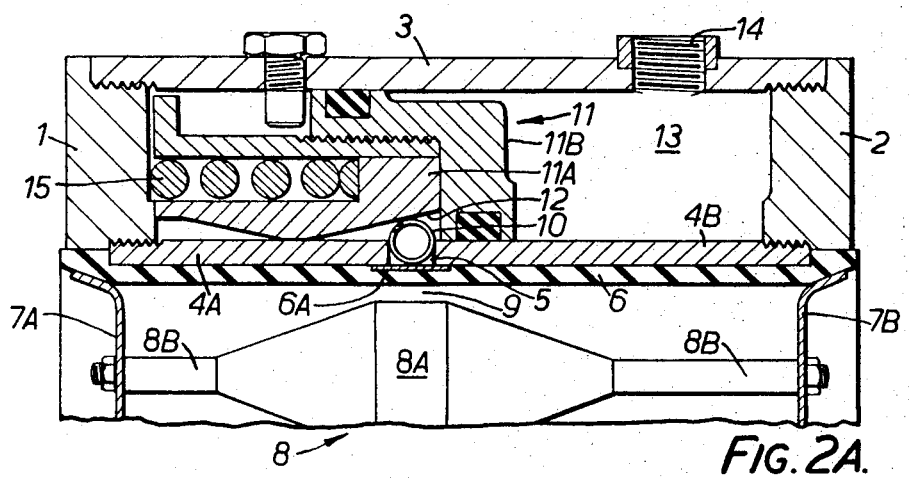
FIG. 2A is a sectional side view of part of a valve, shown in open condition.

Referring first to FIG. 2A, pipe connections 1, 2 that can accept pipes to be coupled through the valve are connected to one another by an outer sleeve 3 in threaded engagement with the pipe connections 1 and 2. Within the sleeve 3 the connections 1, 2 respectively support sleeves 4A, 4B that extend towards one another to define a gap 5 between their adjacent ends. These sleeves 4A, 4B form an enclosure for a flexible tube 6 therewithin that forms a flexible walled passage for fluid to pass through. The opposite end portions of the tube 6 are trapped between spiders 7A, 7B and the connection 1/sleeve 4A and the connection 2/sleeve 4B respectively, the spiders being interconnected by an obstructor assembly 8 that includes an obstructor 8A and spindles 8B extending therefrom to which the spiders 7A, 7B are releasably connected. The zone of greatest diameter of the obstructor 8A is disposed in the region of the gap 5 so that at this zone there is an annular passage 9 for fluid that is defined by the flexible tube wall and the obstructor within this wall.

In the gap 5, which is intermediate the ends of the tube 6, there is disposed a coil of filamentary material, conveniently a spring 10, with its direction of length extending around the tube 6.

The sleeve 4A slidingly supports a restrictor 11 consisting of a cam portion 11A threaded into a piston portion 11B. A frusto-conical internal cam surface 12 of the cam portion 11A co-operates with the spring 10, the coils of the spring 10 extending across the gap between the cam surface 12 and the tube 6, so that movement of the restrictor 11 to and fro along its supporting surface, that is, axially of the tube 6, moves the coils of the spring 10 radially in and out. Inwards movement of the coils deforms the ring 6 inwardly.

The restrictor 11 is acted upon at its piston 11B side by pressure medium supplied to a chamber 13 through a port 14, and on the other side by a compression spring 15. The interior of the chamber 13 can be connected either to a source of fluid under pressure, or to exhaust, via the port 14.

Figure 3:
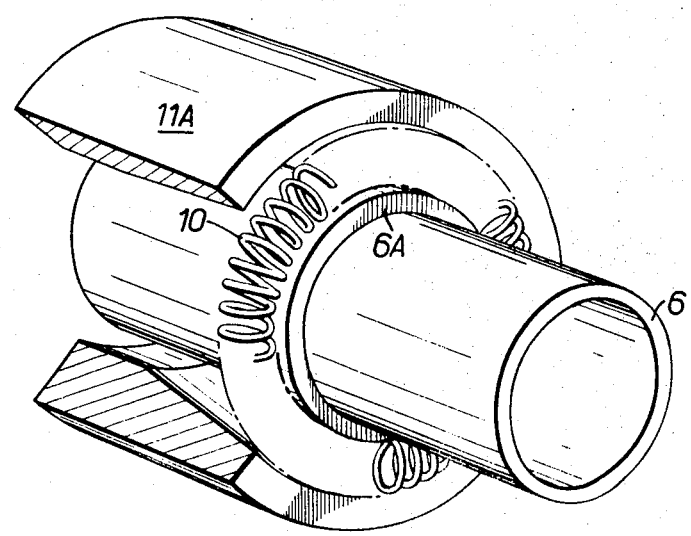
FIG. 3 is a diagrammatic perspective view of part of the valve of FIGS. 2A and 2B, illustrated in slightly modified form.
Figure 4:
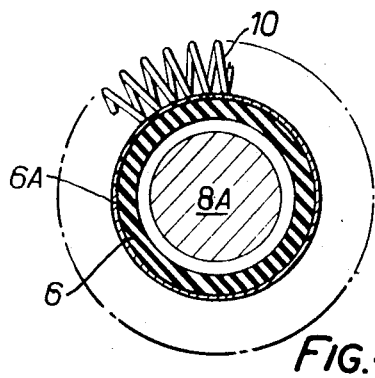
FIGS. 4 and 5 illustrate operation of the valve.
Figure 5:
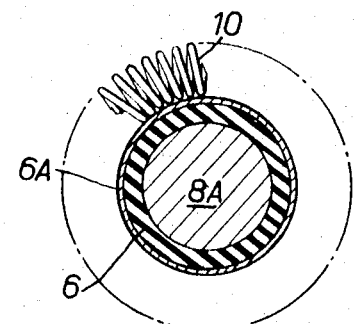

The valve as shown in FIG. 2A is set-up to be opened when the chamber 13 is pressurised, this valve open condition being illustrated in FIG. 2A. The cam surface 12 is positioned to allow the spring 10 to relax and the tube 6 can adopt the illustrated position clear of the obstructor 8A. Fluid can flow through the valve and it will be noted that the flow will be smooth and not subject to sharp changes in direction, the obstructor being of an appropriate streamline shape for optimum flow. If, from this condition, the interior of the chamber 13 is exhausted, the force of the spring 15 becomes preponderant to move the restrictor 11 to the right (as seen in the Figure). The coils of the spring 10 are moved inwardly to act on the tube 6 to deform it radially inwardly, forming a neck in the tube 6 that is sealingly clamped to the obstructor 8A. The spring 10 is close coiled (see, for example, the discussion for the specific embodiment quoted above) such that in the closed condition the coils are nearly touching, the spring presenting virtually a continuous surface around the tube 6 (see FIGS. 3 and 4 — valve open; and FIG. 5 — valve closed).

In the region at which the spring 10 acts the tube 6 is stiffened by an insert 6A of harder resilient material than the remainder of the tube, on which spring 10 bears. However, for the reasons already discussed above, this insert does not have to be of any great closing and thickness. The insert 6A can be replaced by a ring around the outside of the tube (see FIG. 3 — ring 6A').

Figure 2B:
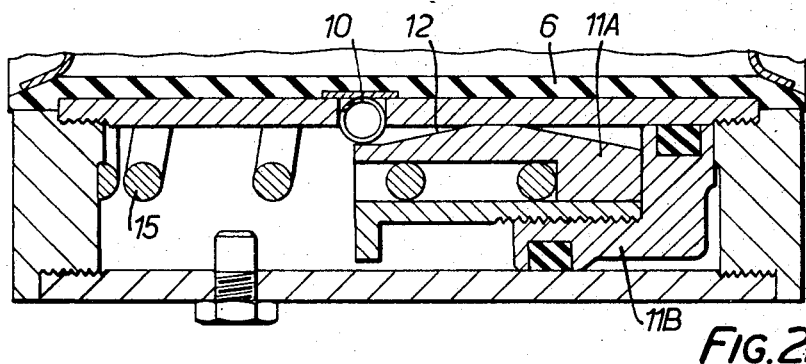
FIG. 2B is a sectional side view of part of the valve of FIG. 2A but shown arranged for a different manner of operation.

In FIG. 2B the valve is shown set-up such that the spring 15 is effective for opening the valve, and pressure on the piston 11B side of the restrictor is effective for closing the valve.

Although fluid under pressure has been described as the external operating medium for effecting movement of the restrictor, it will be appreciated that one or a combination of means could be utilised including manual, fluid, electric motor and electric solenoid. When the pressure of a fluid passing through the valve is required to determine the action of the valve then this pressure could be utilised to actuate the valve, fluid being piped from a point or points in the flow path to effect movement of the restrictor.

It is to be noted that in the valves described there is no leakage path between the fluid flow through the tube and the other operating parts of the valve and it can also be seen that, with the exception of some small components, there is no contact between the fluid passing through the valve and the main constructional components of the valve. This allows the major components of the valve to be made from cheap materials, even when corrosive fluids are being handled.

It is further to be noted that the operational principles of the valves described are such that not only are the operating forces required to give a tight shut-off minimised, but the manner of applying the operating forces allows the dimensions of the valves to be minimised. Also the use of synthetic rubbers or flexible plastics materials for the tube with their self-lubricating properties can be highly advantageous. The use of a mouldable plastics material in the construction can considerably reduce the manufacturing costs. The advantages stemming from the use of a spring to apply closure forces to the flexible tube have already been discussed.

A suitable material for the tube is Viton (Registered Trade Mark).

Other fluorinated elastomers may be suitable for the tube.

Valves as described above are very compact, and as it has been shown, no separate gland is required between the fluid passing through the valve and the operating mechanism, so the number of components required for each valve is small. Further, substantially the same components may be used whether the valve is assembled to be direct or reverse acting as illustrated clearly by FIGS. 2A and 2B.

What is claimed is:

1. A valve including an annular passage for fluid to pass through defined by a flexible wall and an obstructor within the wall, and operating mechanism for bringing about engagement between the wall and the obstructor to seal the wall to the obstructor and hence close the passage to fluid flow; said operating mechanism comprising a frusto-conical cam surface surrounding the flexible wall and movable substantially axially of the intended direction of fluid flow through the passage, and a coil of filamentary material disposed intermediate the cam surface and the flexible wall with its direction of length extending around the flexible wall so that the coils extend across the gap between the cam surface and the flexible wall to be acted upon by the cam surface, upon axial movement thereof, to be moved substantially radially with respect to said intended direction of fluid flow to act on the wall to bring about said engagement, the coils being so closely spaced together as to present a substantially continuous surface to the flexible wall in the closed condition of the valve.

2. A valve according to claim 1, wherein said coil is formed by a spring.

3. A valve according to claim 1, wherein said operating mechanism further comprises means for applying fluid pressure to the cam surface for bringing about operative movement of the cam surface.

4. A valve according to claim 3, wherein said means is arranged for supplying the pressure of fluid flowing through the valve to the cam surface.

5. A valve according to claim 3, wherein said means is effective against resilient opposition.

* * * * *